United States Patent [19]
Malissin et al.

[11] Patent Number: 4,554,653
[45] Date of Patent: Nov. 19, 1985

[54] FOCUSING OPTICAL HEAD MOVABLE RADIALLY BY A CARRIAGE

[75] Inventors: Roland Malissin; Claude Monlouis, both of Paris, France

[73] Assignee: Thomson-CSF, Paris, France

[21] Appl. No.: 470,380

[22] Filed: Feb. 28, 1983

[30] Foreign Application Priority Data

Mar. 2, 1982 [FR] France ................................. 82 03425

[51] Int. Cl.⁴ .......................... G11B 7/08; G11B 21/10
[52] U.S. Cl. ........................................ 369/45; 369/44; 369/32; 350/247; 350/255
[58] Field of Search ....................... 369/44, 45, 46, 32, 369/33, 41; 350/247, 255; 358/372

[56] References Cited

U.S. PATENT DOCUMENTS

| | | | |
|---|---|---|---|
| 3,969,574 | 7/1976 | Janssen et al. | 369/44 |
| 4,092,529 | 5/1978 | Aihara et al. | 369/44 |
| 4,185,836 | 1/1980 | Taylor et al. | |
| 4,236,232 | 11/1980 | Jansen et al. | 369/44 |
| 4,239,942 | 12/1980 | Van Alem et al. | 369/43 |
| 4,321,701 | 3/1982 | Arguie et al. | 369/45 |
| 4,449,213 | 5/1984 | Noborimoto et al. | 369/44 |

FOREIGN PATENT DOCUMENTS

| | | |
|---|---|---|
| 0002547 | 6/1979 | European Pat. Off. |
| 2262849 | 9/1975 | France |
| 2434457 | 3/1980 | France |
| 2437042 | 4/1980 | France |
| 2455331 | 11/1980 | France |
| 2484683 | 12/1981 | France |

Primary Examiner—Raymond F. Cardillo, Jr.
Assistant Examiner—Alan K. Aldous
Attorney, Agent, or Firm—Oblon, Fisher, Spivak, McClelland & Maier

[57] ABSTRACT

The invention provides an optical head for writing-reading a disk by means of at least a focussed radiation. This apparatus has at least one track, this track having evenly spaced apart grooves. An optical head using a motor having a fixed magnetic circuit with an air-gap in which a mobile assembly moves is provided. A magnetic circuit is additionally used which has a magnetic access and radial tracking circuit having at least one core intersecting all the grooves. The mobile assembly is formed of two actuators. The first of these actuators providing access to and radial tracking of the track. The second provides focussing of the light radiation on this track. There is a flexible fixing device connecting together these two actuators, along with a guide comprising friction sliding elements flexibly mounted on the radial and access actuator and allowing the actuator to slide over the core of the magnetic access and radial tracking circuit.

25 Claims, 20 Drawing Figures

FOCUSING OPTICAL HEAD MOVABLE RADIALLY BY A CARRIAGE

BACKGROUND OF THE INVENTION

The invention relates to the field of recording data on support media readable optically by means of a concentrated radiation and relates more particularly to an optical writing-reading head for an optical disk and an optical device associated with such a head.

In the case of writing and/or reading an optical type disk, it is necessary:

to have access to a zone of the disk,
to remain in this zone with good precision not only radially but also perpendicularly to the surface of the disk (focussing).

In the devices of the prior art an "optical head" fulfils these latter two functions; it is generally formed of an actuator or motor of the "loud-speaker coil" type providing the focussing movement perpendicularly to the face of the disk and an actuator providing the radial track following movement, formed either by an oscillating mirror or by a translation device able to be fixed in the mobile part of the focussing actuator.

Access is obtained by moving the whole of the "optical head" either with a screw system and a DC motor or stepper motor, or with a motor and band system. The technique of the linear motor used in some magnetic disks may also be used.

It is advantageous to be able to use the access actuator for providing at least partially the radial tracking while keeping for this actuator a reduced space occupancy and a control power which is also reduced.

The "optical heads" used conventionally comprise one or more magnetic circuits providing the focussing movements and radial tracking; that results in a relatively high mass for these "optical heads" (of the order of 20 to 40 g).

If it is desired to obtain at least a partial correction of the radial tracking with the access actuator, this latter can very certainly only be of the linear motor type. The mass of the optical head imposes the dimensions and the mass of the linear access motor and consequently the control power of the access actuator.

So as to minimize the dimensions and also consequently the control power of the access actuator, it is apparent that the mass of the "optical head" should be reduced. One solution consists in making the magnetic circuits of the "optical head" fixed and so in coupling to the mobile lens only coils interacting with a fixed field.

However, two coils seem to be duplicated: on the one hand, the coil of the access actuator which provides access and a partial correction of the track deviation and, on the other hand, the coil of the radial tracking actuator. For this the invention consists first of all in eliminating the tracking coil, the access coil then having the two access and radial tracking functions.

Such a device may operate but its performances are limited by the solid friction, essentially non linear, introduced by the guiding of the access coil, whether this guiding is effected by rolling means (rollers or ball bearings) or simple sliding means.

With either rolling or friction guiding, effected directly on the central magnetic core, with such a device a tracking precision of the order of a few micrometers may be obtained. But in an optical type disk, the required precision is of the order of 0.1 micrometer.

Thus, a device of the prior art, described in European patent application published under No. 0 012 650, relates to a device providing vertical and radial positional control by moving a very small weight mobile assembly, these two controls being provided by currents proportional to the movements to be obtained. For that, conducting elements through which the control currents flow are moved in a fixed magnetic field, orthogonal to the radius and extending over the whole effective length of the radius of the disk, and moving in this magnetic field; the reading lens being made integral with these mobile elements.

However, this prior art device is provided with sliding parts in the air-gap of its magnetic circuit and thus presents limitations related to the slide friction and described above.

Thus the correct operation of a combined access and tracking device is coupled essentially to guiding thereof and it is the guiding device for overcoming this serious drawback of the prior art which is the principal object of the invention. In the device of the invention, for providing this guiding, solid friction is kept, guiding by simple sliding is chosen and between the sliding means and the body of the access and radial tracking actuator are inserted elements having great flexibility. Moreover, for this guiding, pairs of materials are used having a minimum friction coefficient.

Moreover, with the focussing actuator fixed on the radial actuator, besides the expected mechanical advantages, certain optical reaction defects may be avoided which are inherent in conventional optical heads; in fact, whether it is a system with radial oscillating mirror or a system with radial translation actuator fixed on the focussing actuator, a movement of the optical beam cannot be completely avoided causing either a diaphragm effect of the pupil of the lens, or a movement or a deformation of the optical return spot.

On the contrary, in the case of a focussing actuator fixed on the radial tracking actuator, these effects are non existent and a radial tracking sensor system, for example of the "push-pull" type, may be used.

SUMMARY OF THE INVENTION

The invention provides an optical writing-reading head for a disk using at least one focussed radiation, this disk comprising at least one track, this track comprising evenly spaced apart grooves, this optical head using a motor comprising a fixed magnetic circuit provided with at least one air-gap in which moves a mobile assembly, this magnetic circuit containing a magnetic access and radial tracking circuit comprising at least one core intersecting all the grooves, this mobile assembly comprising actuators intended for providing access to the track, radial tracking thereof and focussing of the radiation on this track and a focussing lens, the mobile assembly being formed by two actuators, the first providing access and radial tracking, the second providing focussing of the light radiation on this track, flexible fixing means for connecting these two actuators together, the first actuator comprising at least one coil, the second actuator being formed of a coil, guide means for the first actuator allowing sliding of this actuator on each core of the magnetic access and radial tracking circuit, these guide means sliding frictionally on this core being flexibly connected to the body of the radial and access actuator.

It also has as an object the overall device comprising the optical device associated with such a head.

BRIEF DESCRIPTION OF THE DRAWINGS

The invention will be better understood and other features will appear from the following description with reference to the accompanying figures in which.

DESCRIPTION OF THE PREFERRED EMBODIMENTS

So as to minimize the dimensions and so consequently the control power of the access actuator, an improvement of the optical heads consists in reducing the mass of the "optical head" by making the magnetic circuits of the "optical head" fixed and so by only coupling to the mobile lens magnetic coils interacting with a fixed field. Such a system is described in FIGS. 1 and 2, which show schematically one possible type of embodiment.

Figure 1:
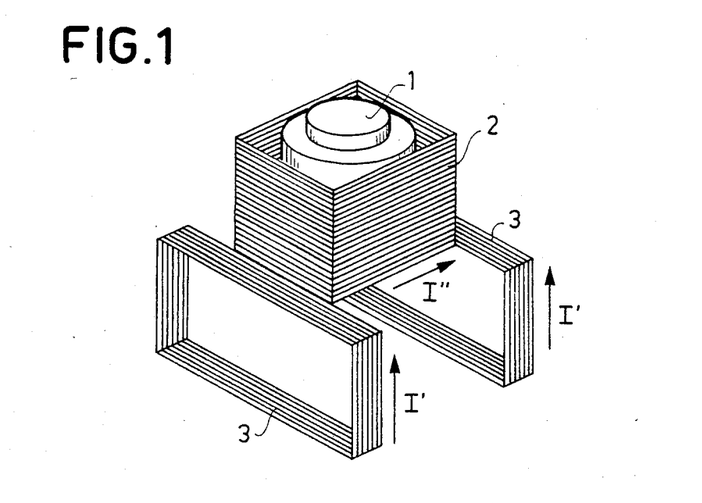
FIGS. 1 and 2 show schematical views of a lightened optical head using three actuators.

FIG. 1 shows a perspective view of the mobile focussing and radial tracking head. 1 represents the lens, 2 the focussing coil and 3 the radial tracking coil. A current I" flows through the focussing coil 2 and a current I' flows through the radial tracking coil 3.

Figure 2:
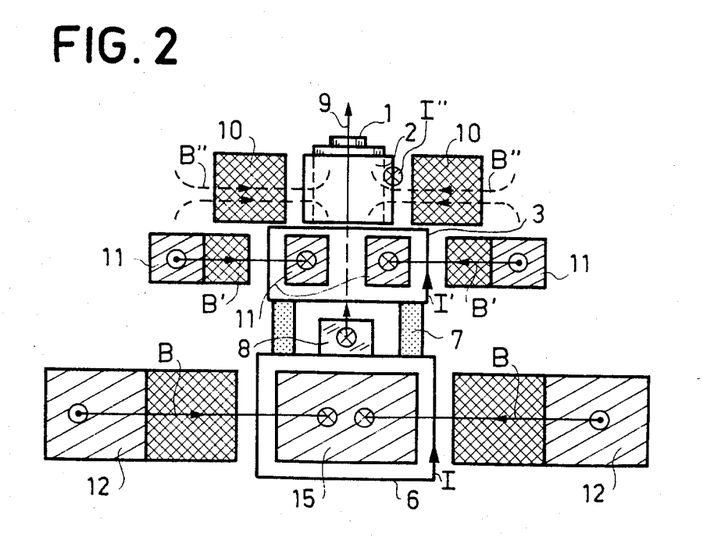

This assembly also appears in FIG. 2 in which the third coil is shown, the access coil 6 through which flows a current I.

A securing means, flexible radially and for focussing, connects the assembly of the two coils 2,3 and lens 1 to the access coil 6.

12 represents the magnetic circuit of the linear access motor. This is a fixed magnetic assembly closed at both ends. It comprises a central core 15 with the directions of the magnetic field B.

In this figure and in the following ones, the hatched parts represent the pole pieces and the cross hatched parts the magnets.

11 shows the radial magnetic circuit and 10 the focussing magnet.

8 represents the reflecting mirror on which is reflected the light beam 9 which is focussed by lens 1 to reach the data support medium.

As shown in FIG. 2, two magnetic fields B' and B" are preferably used having the same directions.

However, two coils seem to be duplicated: on the one hand the coil 6 of the access actuator which provides access and partial correction of the track deviation and, on the other hand, coil 3 of the radial tracking actuator. Moreover, such a device seems complicated to construct and so not very interesting. Thus, the great interest of the invention can be seen which consists in eliminating the tracking coil 3, the access coil 6 then taking over the two access and radial tracking functions.

The system is formed of a radial and access actuator to which the focussing actuator is fixed. All the magnetic circuits are fixed and having a length slightly greater than the effective radial length of the disk, the mobile elements are limited to the optical components (fundamentally the lens) and to the coils of the actuators. The two basic magnetic circuits are described in FIG. 3 and following.

Figure 3:
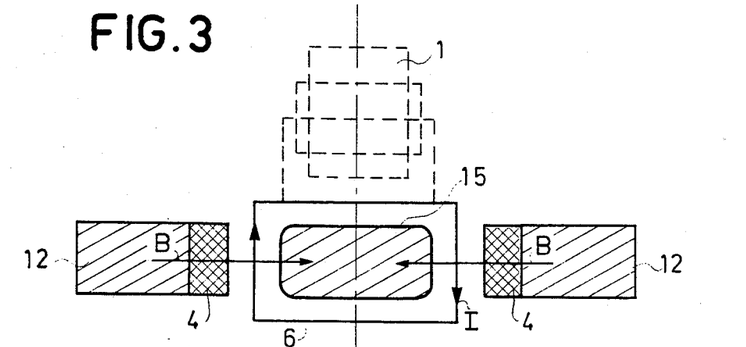
FIGS. 3, 4 and 5 illustrate different aspects of an optical head in accordance with the invention.
Figure 4:
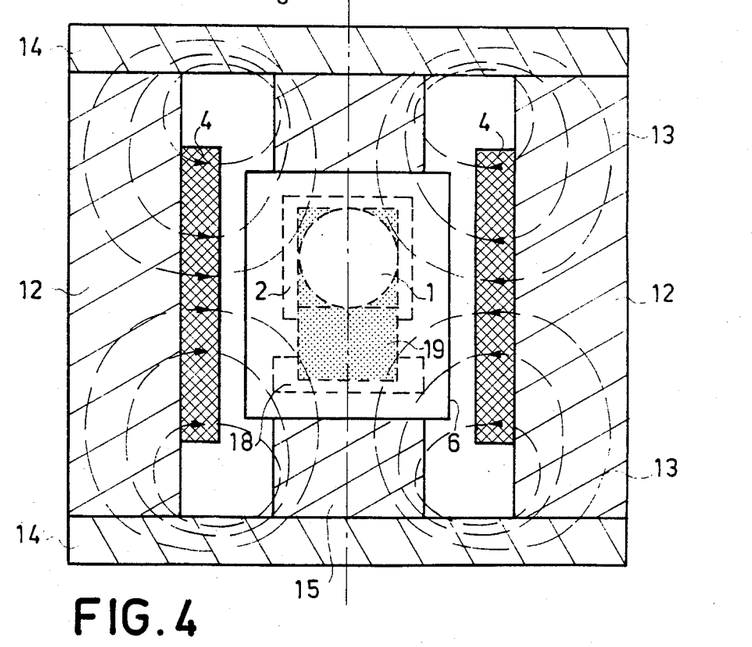

FIGS. 3 and 4 illustrate the radial and access actuator part.

FIG. 3 is a schematical sectional view in which we find again lens 1 situated on the focussing actuator, the central core 15 of the radial and access actuator 4, the right-hand and left-hand magnets and finally 12 the pole pieces of this actuator. At 6 is shown the corresponding coil.

The same elements are shown in FIG. 4 which is a top view of the device. The magnetic field lines are shown at 13. The bars 14 close the field at the ends of this actuator. The focussing actuator which comprises coil 2 and to which lens 1 is connected, is connected to the preceding actuator by means of a flexible spring blade 19 embedded in a support 18 which is integral with coil 6 of the preceding actuator. This coil 6 plays the role of the preceding coils 3 and 6 of FIG. 2.

Figure 5:
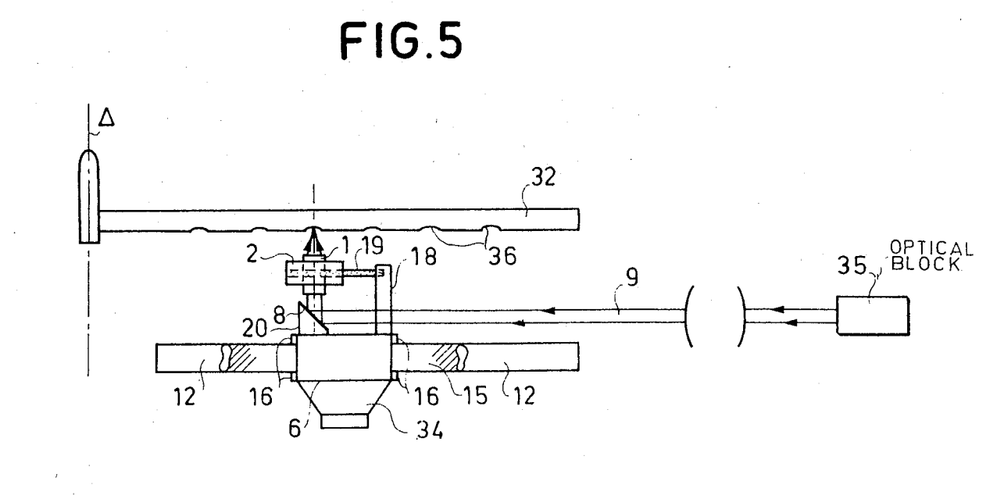

FIG. 5 illustrates this radial and access actuator part incorporated in the complete device for recording-reading the disk. We find again then in an exploded view the central core 15 and the pole pieces 12 of this actuator as well as the focussing actuator comprising coil 2. This focussing actuator to which the lens is coupled is connected through a flexible spring blade 19 embedded in a support 18 to the coil of the preceding actuator. Mirror 8 is also rigidly fixed to the radial and access actuator by a support 20.

Disk 32 which comprises at least one circular or spiral track is shown with grooves 36, it rotates about axis Δ.

The optical block 35 contains a laser source which produces a collimated radiation 9, which after reflection by mirror 8 is focussed on the track of the disk by lens 1; the optical block 35 also contains all the optical components known by a man skilled in the art for receiving the radiation beam reflected by the disk and for detecting it so as to generate the data reading signal, as well as the signals for measuring the radial tracking deviation and the focussing deviation.

Coil 6 is shown here with shoes 16, for example made from rubber, which allows sliding over the central core 15. A mass for balancing this coil 6 is shown at 34.

To simplify this figure, the magnetic focussing circuit shown at 10 in FIG. 2 has been omitted.

Figure 8:
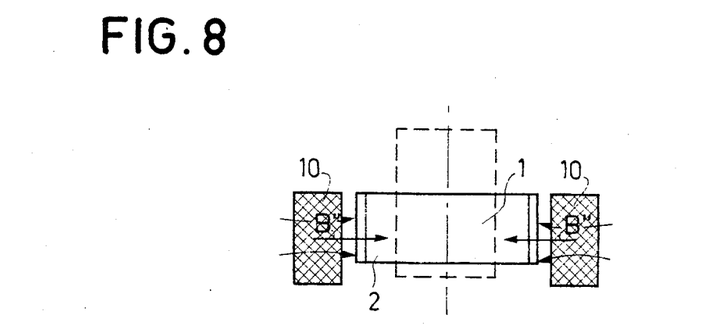
FIGS. 8, 9, 10, 11, 12 and 13 illustrate different particular aspects of the invention.
Figure 9:
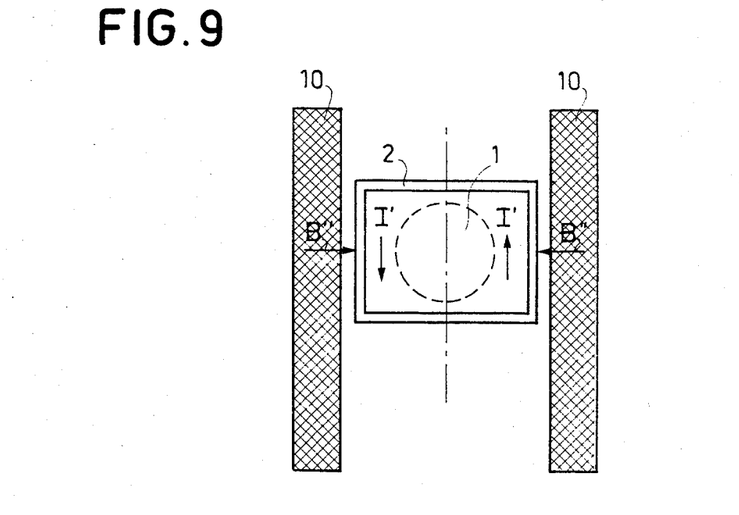
Figure 10:
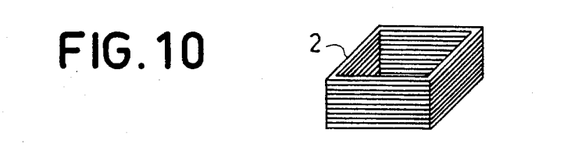

FIGS. 8, 9 and 10 show the focussing actuator part with a coil 2, magnets 10 and a lens 1.

The focussing element fixed on the radial and access element is fixed flexibly in the focussing direction (it has a low resonance frequency of for example 30 Hz). In the radial direction, this fixing must provide great stiffness: it must have a high resonance frequency, that is situated beyond the band of the radial servomechanism, namely of the order of 5 to 10 kHz. This condition is obtained fairly easily with two parallel blades made from a material with a high modulus of elasticity. These blades are flexing when the focusing element moves in the focusing direction and they are either stretched or compressed when the focusing element moves in the radial direction. Because of the high frequency rejection of this resonance, the loop correction filter may be introduced in a zone with phase shift $\pi$. In fact, by simply introducing a phase advance filter of the resistive-capacitive type for example, a servo-mechanism of the second degree may be obtained.

An additional inertial mass is rigidly fixed to the radial tracking and access coil on the side opposite that to which is fixed the focussing element. This is shown at 34 in FIG. 5.

Because of the impossibility of perfectly merging the center of application of the forces of the radial tracking and access coil and the center of gravity of the complete mobile assembly (radial tracking and access coil, focussing coil, additional inertial mass), the force of the radial tracking coil produces, in addition to the radial translational movement, a pitching movement. So that this pitching movement does not prevent closure of the radial servo-control loop with a satisfactory gain, the thrust center of the forces and the center of gravity of the assembly should be positioned so that this pitching results, at the level of the disk, in a movement in the direction of the translational movement which is in phase therewith as much as possible. It is the role of the additional inertial mass 34 to allow this positioning of the center of gravity.

The additional inertial mass 34 must be chosen with as small a mass as possible so as not to reduce too much the radial sensitivity of the system, while allowing the center of gravity to be positioned at the desired location. It must then be a rigid structure, rigidly fixed to the radial tracking coil, but with the greater part of its mass distant from this latter.

Figure 6:
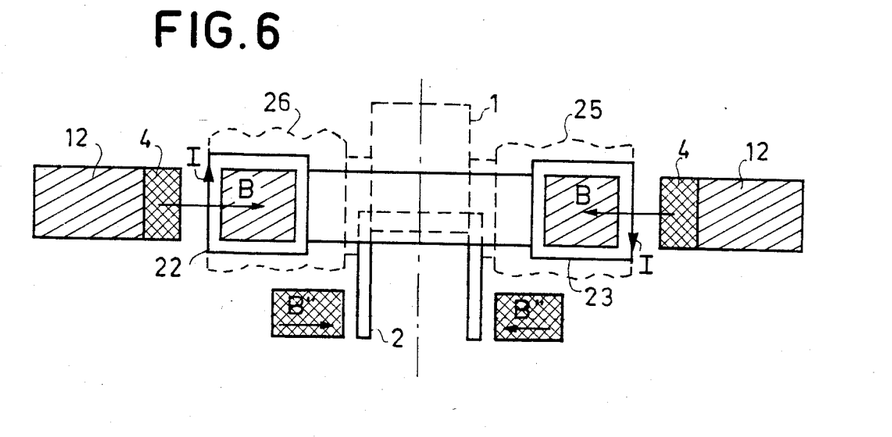
FIGS. 6 and 7 illustrate a variation of the optical head of the invention.
Figure 7:
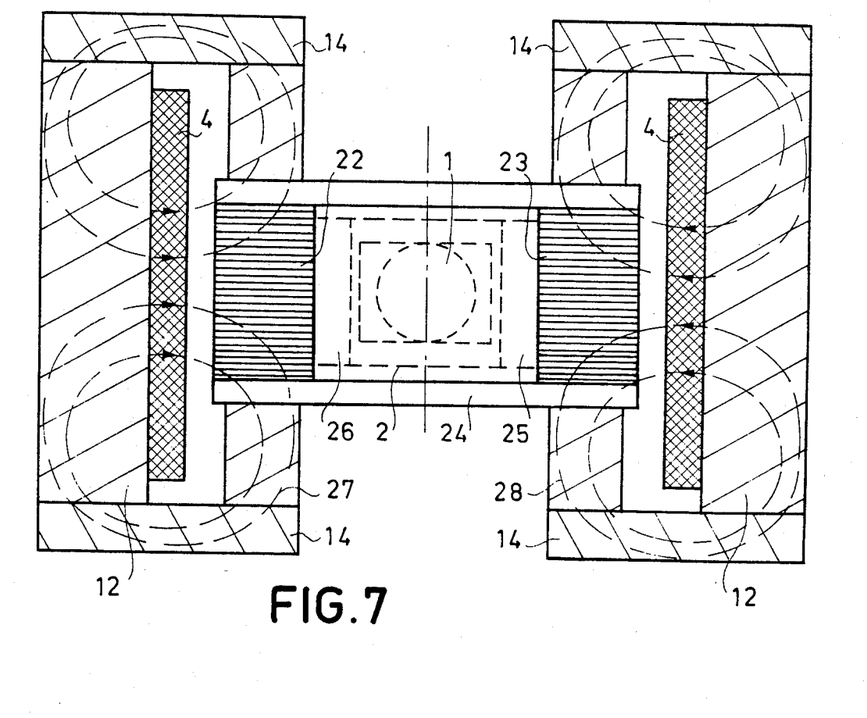

A variation of the present device is shown in FIGS. 6 and 7 which correspond respectively to FIGS. 3 and 4. The radial and access actuator then comprises two central cores 27 and 28 on which are guided two coils 22 and 23. 24 represents a rigid frame connecting together the two radial coils 22 and 23.

Figure 11:
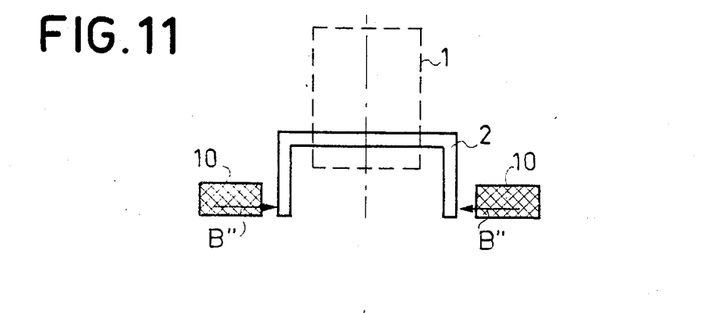

The other parts of the radial actuator have remained the same and are numbered in the same way as before: we find again the pole pieces 12 and magnets 4. We also find again lens 1. But this time, the focussing actuator is different; on the one hand, it is connected to the two coils 22 and 23 through a resilient suspension shown at 25 and 26 and, on the other hand, it is formed of a coil 2, shown in FIGS. 11 and 3, interacting with two magnets 10 shown in FIG. 11.

Figure 12:
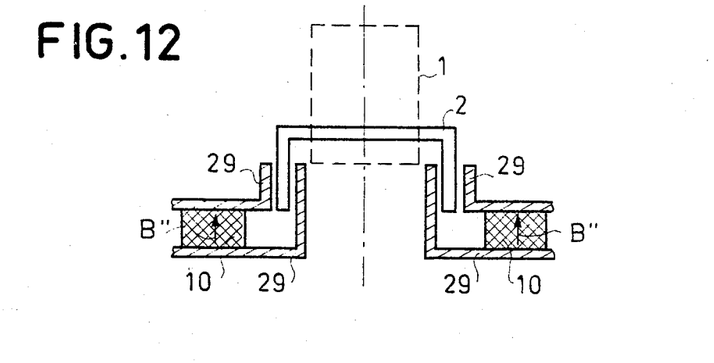
Figure 13:
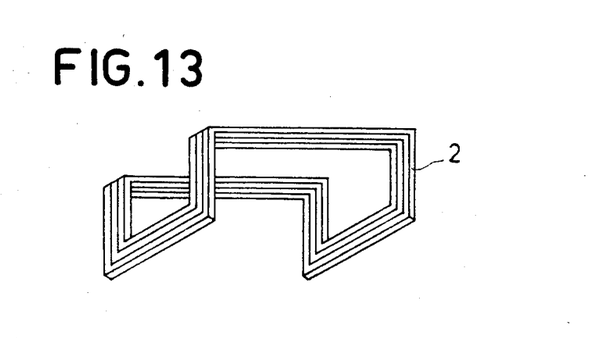

A variation of this focussing actuator is shown in FIG. 12 with pole pieces 29 and magnets 10.

For the guiding, solid friction has been kept, guiding by simple sliding is chosen and low mass elements having great flexibility are inserted between the sliding means and the body of the access and radial tracking actuator: moreover for this guiding, pairs of materials are used having a minimum friction coefficient.

Experience shows that, with the system, under normal conditions, a residual error of the order of 0.1 micrometer and even less may be obtained, so very much less than that obtained with pure solid sliding friction.

Figure 14:
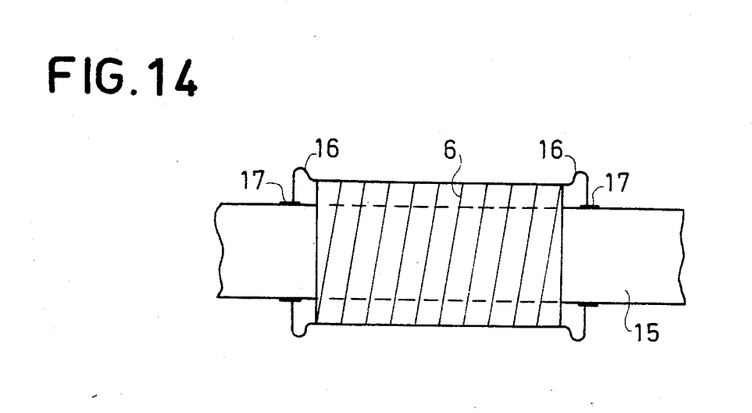
FIGS. 14 and 15 illustrate the device for guiding the optical head in accordance with the invention.
Figure 15:
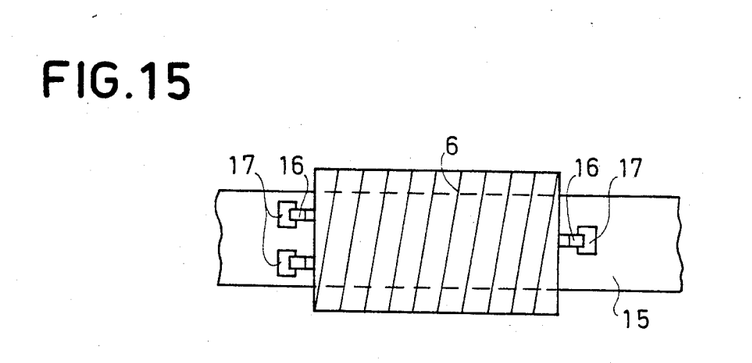

Embodiments of the device of the invention are shown in FIGS. 14 to 20. In FIGS. 14 and 15 small lugs 16 elastic in the radial direction (and incidentally in the focussing direction) are fixed to the radial and access coil 6 and rest by their ends 17, treated so as to have a low friction coefficient, on the central core 15. They slide or are deformed on the spot depending on the force applied to the radial coil 6.

Figure 16:
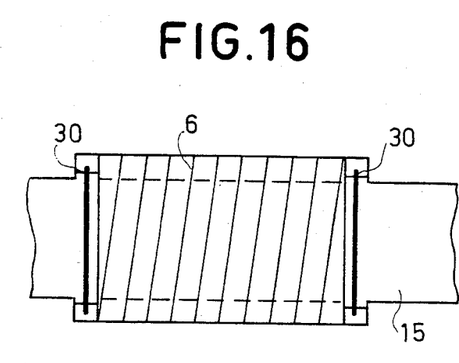
FIGS. 16, 17, 18, 19 and 20 illustrate variations of this guide device.
Figure 17:
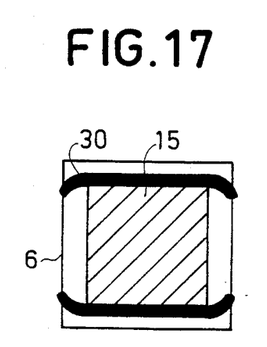
Figure 18:
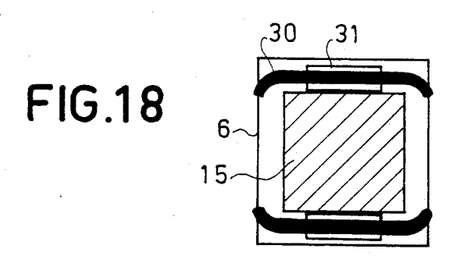

In FIGS. 16, 17 and 18 rubber strands 30 of circular section are fixed rigidly to the radial and access coil 6 and rest at their central part on the central core 15 of the radial magnetic circuit. They slide or roll while causing their ends to work under torsion depending on the force applied to the radial coil 6. They may be provided with one or more sheath portions 31 with low friction coefficient in the zone in which they bear on the central core, as shown in FIG. 18.

The cylindrical sheath surrounding the rubber (and perfectly integral with the rubber) may have an outer diameter a little greater or several times greater than that of the rubber axis.

Figure 19:
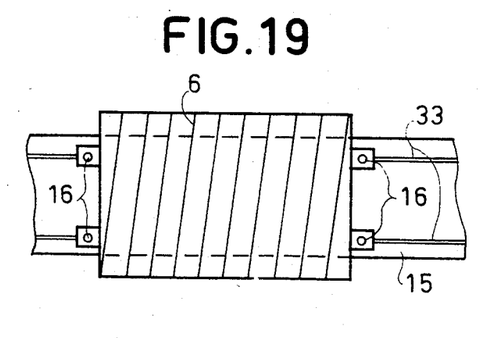
Figure 20:
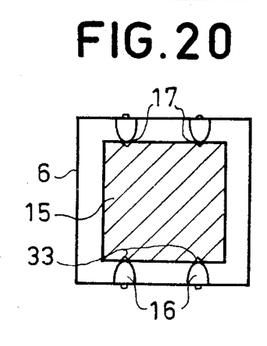

In FIGS. 19 and 20 small resilient lugs formed with rubber feet 16 at the rounded ends 17 are rigidly fixed to the radial and access coil; they slide on core 15 or work under flexion depending on the force applied to the radial coil. They slide, for example, in V shaped grooves 33 machined in core 15.

Any other flexible device, not described here, fixed rigidly to coil 6 and bearing by sliding or rolling on core 15 comes within the scope of the invention.

Since the focussing element is directly subjected to the focussing force, the response of its movement at high frequencies remains an inverse square of the frequency despite the flexibility of the suspension of the radial coil. Consequently, no problem of loop correction arises since the phase shift does not exceed $\pi$.

The above described system is more particularly adapted to the case where the recording-reading optical system is divided into two parts: a fixed part comprising the light sources and the sensors and a mobile part, the "optical head" comprising the actuators and the lens to which a reflecting mirror must be added for reflecting on to the lens the light beam coming from the fixed part of the optical system and, conversely, for sending back to the fixed part of the optical system the beam reflected by the disk and coming from the lens. This is the case which has been chosen for describing the invention.

It may however be used in a compact simplified head and especially in the case of a single reader whose optical system may be more easily lightened; in this case, the optical assembly is situated on the radial and access motor; the lens serving for focussing on the disk may, so as to present a reduced mass, be in the form of an aspherical monolens or a holographic lens.

The laser is a semi-conductor laser and the optical elements are reduced to their smallest possible dimensions.

By way of example, the actuators described may be controlled by the following electronic means:

The focussing may be provided for example by a circuit comprising a proportional correction both by derivation and possibly by integration.

The tracking may be provided for example by circuits comprising proportional correction by derivation and by integration and if need be the circuit for amplification of the error signal may have a non linearity corresponding to a higher gain for small signals.

Access to the track of the disk may be provided for example by a microprocessor managed control with speed servo-control.

What is claimed is:

1. A device for controlling access to a track element belonging to a set of adjacent track elements arranged in a reference surface of a data carrier, said device comprising:

an objective lens projecting a light spot for interaction with anyone of said track elements; said objective lens being movable along a first direction perpendicular to said reference surface for controlling the focusing of said spot and along a second direction parallel to said reference surface and transverse to said track elements for controlling said access;

bench means;

carriage means slidably mounted on said bench means for causing said objective lens to displace along said second direction; wherein said objective lens is supported by said carriage means using a lens mount movable along said first direction; and wherein said carriage means comprises a body for supporting said lens mount, moving coil actuator means secured by said body for generating an electrodynamic force parallel to said second direction;

a plurality of slider contacting areas in frictional relationship with said bench means; and spring connecting means arranged between said slider contacting areas and said body for enabling, in at least said second direction, a relative motion between said body and said slider contacting areas.

2. A device as claimed in claim 1, wherein the center of gravity of said carriage means and the thrust center of said electrodynamical force are arranged for preventing a tendency to pitching of said carriage.

3. A device as claimed in claim 1, wherein said objective mount is attached to said body with elastic sustentation means easily deformed for displacement of said objective lens in said first direction which remaining stiff for displacement of said objective lens in said second direction.

4. A device as claimed in claim 1, wherein said moving coil actuator means comprises:
a pair of moving coils.

5. A device as claimed in claim 3, wherein said elastic sustentation means comprises:
at least one flexible cantilever beam having one end anchored to said carriage and carrying said lens mount at the opposite end.

6. A device as claimed in claim 3, wherein said elastic sustentation means comprises:
an upper and lower flexible cantilever beam.

7. A device as claimed in claim 3 wherein said elastic sustentation means comprises:
two side by side elastic elements between which is arranged said lens mount.

8. A device as claimed in claim 1, wherein said slider contacting areas are built up in a triangular arrangement.

9. A device as claimed in claim 1, wherein said bench means comprises:
at least one prismatic beam having an axis parallel to said second direction.

10. A device as claimed in claim 9, wherein said bench means comprises:
a pair of parallel prismatic beams surrounding said body.

11. A device as claimed in claim 9, wherein said prismatic beam has two opposite lateral faces with respective guidance paths for bearing said slider contacting area.

12. A device as claimed in claim 1, wherein said spring connecting means comprises:
compliant arcuate legs ended by said slider contacting areas.

13. A device as claimed in claim 1, wherein said spring connecting means comprises:
strands anchored by their ends to said body; said slider contacting areas being situated between said ends.

14. A device as claimed in claim 13, wherein said slider contacting areas pertain to a cladding of said strands.

15. A device as claimed in claim 1, wherein said spring connecting means are made of rubber material.

16. A device as claimed in claim 1, wherein said slider contacting areas pertain to a piece of material having a low friction coefficient.

17. A device as claimed in claim 16, wherein said slider contacting areas pertain to rolling means associated with said spring connecting means.

18. A device as claimed in claim 1, wherein said moving coil actuator means comprises:
electrical conductor means subjected to a fixed magnetic field perpendicular to said first and second directions.

19. A device as claimed in claim 18, wherein further moving coil actuator means are provided for displacing said lens mount along said first direction.

20. A device as claimed in claim 18, wherein said further moving coil actuator means comprises:
further electrical conductor means subjected to another magnetic field.

21. A device as claimed in claim 20, wherein
said magnetic fields are created by fixed inductor means;
said electrical conductor means being portions of coils located in air gaps of
said fixed inductor means; said coils being respectively attached to said lens mount and said body.

22. A device as claimed in claim 21, wherein said fixed inductor means are embodied in said bench means.

23. A device as claimed in claim 22, wherein said bench means comprise at least one magnetized core encircled with one of said coils.

24. A device as claimed in claim 1, wherein said carriage means form an optical head having radiation source means for illuminating said reference surface, and photodetector means for collecting radiation emerging from said reference surface.

25. A device as claimed in claim 1, wherein said carriage means form an optical head having mirror means arranged for exchanging radiation between said objective lens and a fixed optical unit which comprises radiation source means and photodetector means.

* * * * *